(12) United States Patent
Wu et al.

(10) Patent No.: US 10,951,960 B1
(45) Date of Patent: Mar. 16, 2021

(54) DYNAMIC CONTENT INSERTION

(71) Applicant: Amazon Technologies, Inc., Seattle, WA (US)

(72) Inventors: Yongjun Wu, Bellevue, WA (US); Harrison Clement, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 92 days.

(21) Appl. No.: 16/037,373

(22) Filed: Jul. 17, 2018

(51) Int. Cl.
| | |
|---|---|
| *H04N 7/025* | (2006.01) |
| *H04N 21/845* | (2011.01) |
| *H04N 21/234* | (2011.01) |
| *H04L 29/06* | (2006.01) |

(52) U.S. Cl.
CPC ..... *H04N 21/8456* (2013.01); *H04L 65/4069* (2013.01); *H04L 65/605* (2013.01); *H04L 65/607* (2013.01); *H04L 65/608* (2013.01); *H04N 21/23424* (2013.01)

(58) Field of Classification Search
CPC .......... H04N 21/8456; H04N 21/23424; H04L 65/607; H04L 65/4069; H04L 65/605; H04L 65/608
USPC ......................................................... 725/32
See application file for complete search history.

(56) References Cited

U.S. PATENT DOCUMENTS

| | | | | |
|---|---|---|---|---|
| 8,412,841 B1 * | 4/2013 | Swaminathan | ....... | H04L 65/607 709/231 |
| 10,063,927 B1 * | 8/2018 | Singh | ............... | H04N 21/26266 |
| 10,104,143 B1 * | 10/2018 | Li | ............................ | H04L 67/02 |
| 10,313,722 B1 * | 6/2019 | Searl | ...................... | H04N 21/242 |
| 10,412,412 B1 * | 9/2019 | Waggoner | ........ | H04N 21/26241 |
| 10,448,065 B2 * | 10/2019 | Barkley | ......... | H04N 21/234345 |
| 10,506,262 B2 * | 12/2019 | Ma | ........................... | H04L 67/18 |
| 10,516,911 B1 * | 12/2019 | Nielsen | .............. | H04N 21/2365 |
| 10,523,978 B1 * | 12/2019 | Nielsen | .............. | H04N 21/2187 |
| 10,601,887 B2 * | 3/2020 | Knox | ................... | H04L 65/4084 |
| 2013/0238740 A1 * | 9/2013 | Vass | ..................... | H04L 67/2857 709/213 |
| 2013/0332971 A1 * | 12/2013 | Fisher | .............. | H04N 21/26258 725/93 |
| 2014/0279852 A1 * | 9/2014 | Chen | ....................... | G06F 16/43 707/609 |

(Continued)

*Primary Examiner* — Pankaj Kumar
*Assistant Examiner* — Sahar Aqil Riaz
(74) *Attorney, Agent, or Firm* — Eversheds Sutherland (US) LLP

(57) ABSTRACT

Systems, methods, and computer-readable media are disclosed for dynamically inserting secondary content into a live stream or a video on demand (VOD). The secondary content can include, for example, a public service announcement or warning, censoring content, live or prerecorded commentary, an advertisement, or any other type of content to be integrated with or inserted into the main content. Example methods may include receiving a content stream including a first fragment having a first duration and a second fragment having the first duration. Certain methods may include determining an increased quality of service associated with encoding the content stream into fragments having a second duration. Certain methods may include generating, based at least in part on the increased quality of service, a third fragment having the second duration, and sending the content stream having the third fragment to a user device.

20 Claims, 10 Drawing Sheets

(56) References Cited

U.S. PATENT DOCUMENTS

| | | | | |
|---|---|---|---|---|
| 2014/0280688 | A1* | 9/2014 | Mao | H04L 65/80 709/214 |
| 2015/0006752 | A1* | 1/2015 | O'Hare | H04N 21/812 709/231 |
| 2015/0256577 | A1* | 9/2015 | Gutierrez Vilaro | H04L 65/4084 709/203 |
| 2015/0269629 | A1* | 9/2015 | Lo | H04N 21/85406 705/14.66 |
| 2017/0041372 | A1* | 2/2017 | Hosur | H04N 21/23424 |
| 2017/0126256 | A1* | 5/2017 | Salomons | H04N 21/4825 |
| 2017/0134466 | A1* | 5/2017 | Giladi | H04L 65/1089 |
| 2017/0142180 | A1* | 5/2017 | McGowan | H04N 21/242 |
| 2017/0171287 | A1* | 6/2017 | Famaey | H04N 21/85406 |
| 2017/0264923 | A1* | 9/2017 | Lacivita | G11B 27/102 |
| 2017/0272816 | A1* | 9/2017 | Olds | H04L 67/143 |
| 2017/0280181 | A1* | 9/2017 | Ramaley | H04N 21/2662 |
| 2017/0289597 | A1* | 10/2017 | Riedel | H04N 21/2668 |
| 2017/0339105 | A1* | 11/2017 | Gavade | H04N 21/8352 |
| 2018/0302692 | A1* | 10/2018 | Lacivita | H04N 21/26258 |
| 2019/0037252 | A1* | 1/2019 | Wagenaar | H04N 21/23106 |
| 2019/0058900 | A1* | 2/2019 | Ramaley | H04N 21/472 |
| 2019/0090001 | A1* | 3/2019 | Smith | H04N 21/23439 |
| 2019/0149819 | A1* | 5/2019 | Phillips | H04N 19/80 375/240.02 |
| 2019/0149856 | A1* | 5/2019 | Ramaley | H04N 21/8455 725/34 |
| 2019/0155949 | A1* | 5/2019 | Castaneda | G06F 16/9038 |
| 2019/0208285 | A1* | 7/2019 | Chapman | H04N 21/26258 |
| 2020/0077127 | A1* | 3/2020 | Morrow | H04N 21/8456 |
| 2020/0107055 | A1* | 4/2020 | Grant | H04N 21/8455 |
| 2020/0134177 | A1* | 4/2020 | Chalmandrier-Perna | G06F 9/45558 |

* cited by examiner

DYNAMIC CONTENT INSERTION

BACKGROUND

The increased availability of media content over data communications networks such as the Internet has mirrored the increased bandwidth for these networks. The delivery of media over these networks can be accomplished in many ways, including through on-demand video distribution (sometimes referred to as video on demand (VOD) or on demand viewing) and media streaming (sometimes referred to as live streaming, pseudo-live streaming, or streaming). Video on demand is a media distribution system that allows users to select and consume media content whenever they choose, rather than at a scheduled broadcast time. For example, a user can watch or listen to video or audio content, such as movies and TV shows, at any desired time, regardless of the time of the original broadcast. Media streaming systems allow users to consume media that is simultaneously (or near simultaneously) recorded and broadcast in real-time. For example, a user could watch a live stream of a social media influencer or a celebrity pursuing an activity of interest, such as a famous chef cooking a meal in real-time. Because media has recently taken a more prominent role in data communications, the distribution of media and the data associated with such distribution through video on demand or media streaming platforms has become increasingly important to media content distributors, Internet providers, local and federal governments, and advertisers.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
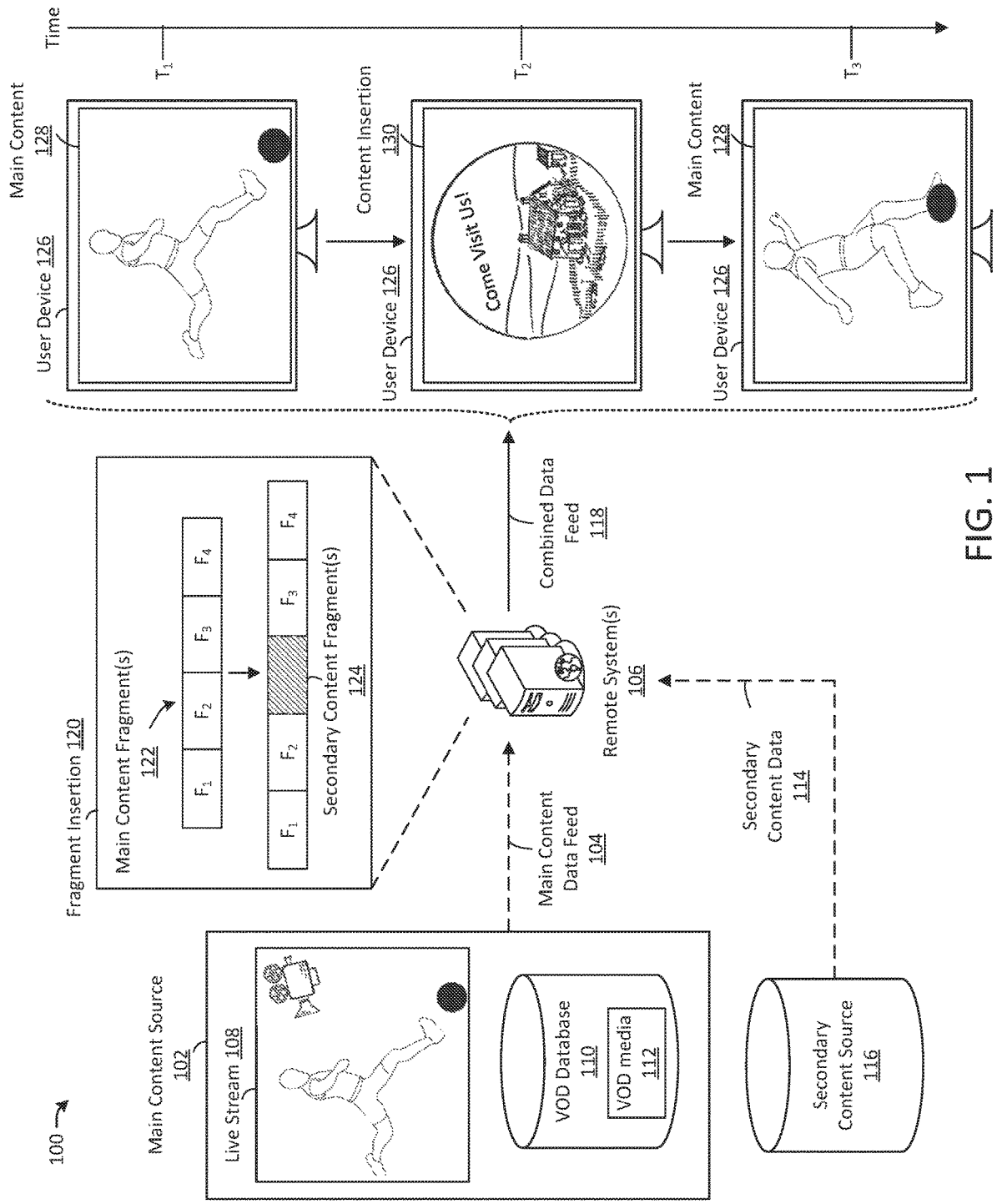
FIG. 1 is a hybrid system and process diagram illustrating the insertion of secondary content into a main content data feed in accordance with one or more example embodiments of the disclosure.

The popularization of both on-demand viewing and media streaming as methods for media distribution has grown exponentially. This increased popularization has created new problems for media content distributors, Internet providers, local and federal governments, and advertisers. One such problem is the increased difficulty in successfully modifying the media content delivered over video on demand and media streaming platforms. For example, it can be difficult to dynamically insert content into a media feed delivered through a video on demand or media streaming platform. Modifying a primary or main data feed to include secondary data is referred to herein as a content insertion. Content distributors, Internet providers, local and federal governments, advertisers, and other organizations associated with media distribution, such as regulatory bodies, have various motivations for inserting secondary data into primary media content. For example, a content distributor may want to insert an advertisement into a VOD or live stream. In another example, a local or federal government may want to insert a public service announcement, such as an amber alert, into the media. In yet another example, a content distributor or regulatory body may want to insert censoring content, such as a tone or image, into the media.

The need for dynamic content insertion raises many issues for both video on demand and media streaming platforms. Both video on demand and media streaming platforms rely on the use of pre-fragmented or chunked media assets, commonly referred to as fragments, for media distribution. A VOD or streamed content may be broken down into these fragments, which are then stored for later retrieval. Retrieval of these fragments can be much later, in the context of a VOD access, or nearly instantaneous (near real-time), in the context of streaming. In some implementations, a corresponding index file, commonly referred to as a manifest, may be provided to help retrieve these fragments. For example, the manifest may contain fragment data, such as a pointer, link (e.g., URL), redirect, or timing data associated with each fragment that ultimately allows an end user device, such as a media player, to receive each fragment at the appropriate time. The manifest may also include fragment sequence data, as well as various media data, such as a computer program or instruction for encoding or decoding the fragments (commonly known as a CODEC), a fragment title, etc.

The use of manifests and fragments by video on demand and media streaming platforms greatly complicates dynamic content insertion. In one example, video on demand and media streaming platforms often leverage multiple manifests for the same source content to improve the quality of service (QoS) or user experience associated with a media consumption. By generating a large number of alternative manifests (or sub-streams) for a given piece of source content, these platforms can allow for the delivery of content at different bitrates, content having different captions, content dubbed or subtitled with alternative languages, etc. Unfortunately, these requirements can deprive a media provider of the ability to insert content such as advertisements or announcements efficiently into the main or source content, as a separate insertion of secondary content may be required for each of these alternative manifests.

In another example, due to the adoption of manifests and fragments by video on demand and media streaming platforms, themselves should be converted into fragments compatible with the manifest. It can be difficult to provide secondary content fragments of a secondary content that are compatible with the main content fragments, and which do not negatively impact or otherwise degrade the quality of service (QoS) associated with a presentation of the main content at the user device. It can also be difficult to provide sufficient ad insertion accuracy (e.g., to locate the correct main content fragments between which the secondary content should be inserted).

These difficulties make it challenging to provide, for example, dynamically changing advertising content, which may be desired to meet the demands of content producers and content distributors. For example, advertisers may want to use demographic information and user profile information to provide targeted content customized for each viewer or group of viewers. Doing so may require the generation of a potentially large number of unique manifests, and the proper positioning of the insertions of any secondary content into the main content of each respective manifest, which may be computationally expensive, and may be infeasible in some contexts having a very large number of separately targeted users.

Embodiments of the disclosure include devices, systems, methods, computer-readable media, techniques, and methodologies for providing dynamic ad insertions for both video on demand and live streaming platforms. Certain embodiments provide new techniques for modifying and providing manifests having both main content and secondary content inserted into the main content. Although described primarily in the context of video of demand and the live streaming of video content, aspects of the invention may be applied to various other forms of digital media, including subtitle streams, audio streams, trickplay streams, or any other media content accessible on a user device through a manifest.

Referring to FIG. 1, an example use case 100 for inserting secondary content into a main content data feed is depicted in accordance with one or more example embodiments of the disclosure. As illustrated in FIG. 1, a main content source 102 may provide a main content data feed 104 to a remote system 106. The main content source 102 may include a live stream 108 or a video on demand (VOD) database 110, as the case may be. For example, the main content data feed 104 may include encoded data from the live stream 108. Alternatively, the main content data feed 104 may include encoded data from the VOD database 110.

In some embodiments, the live stream 108 may be associated with a media streaming platform and a live, real-time, or near real-time (pseudo-live) recording of a streamed event. As illustrated, the live stream 108 depicts a real-time stream of a soccer player kicking a soccer ball.

In some embodiments, the VOD database 110 may be associated with one or more prerecorded media, video, or audio files, such as a movie, TV recording, song, etc. As illustrated, the VOD database 110 may include a VOD media 112. The VOD media 112 may include, for example, a video recording of a soccer player kicking a soccer ball, in much the same way as the live stream 108.

Figure 7:
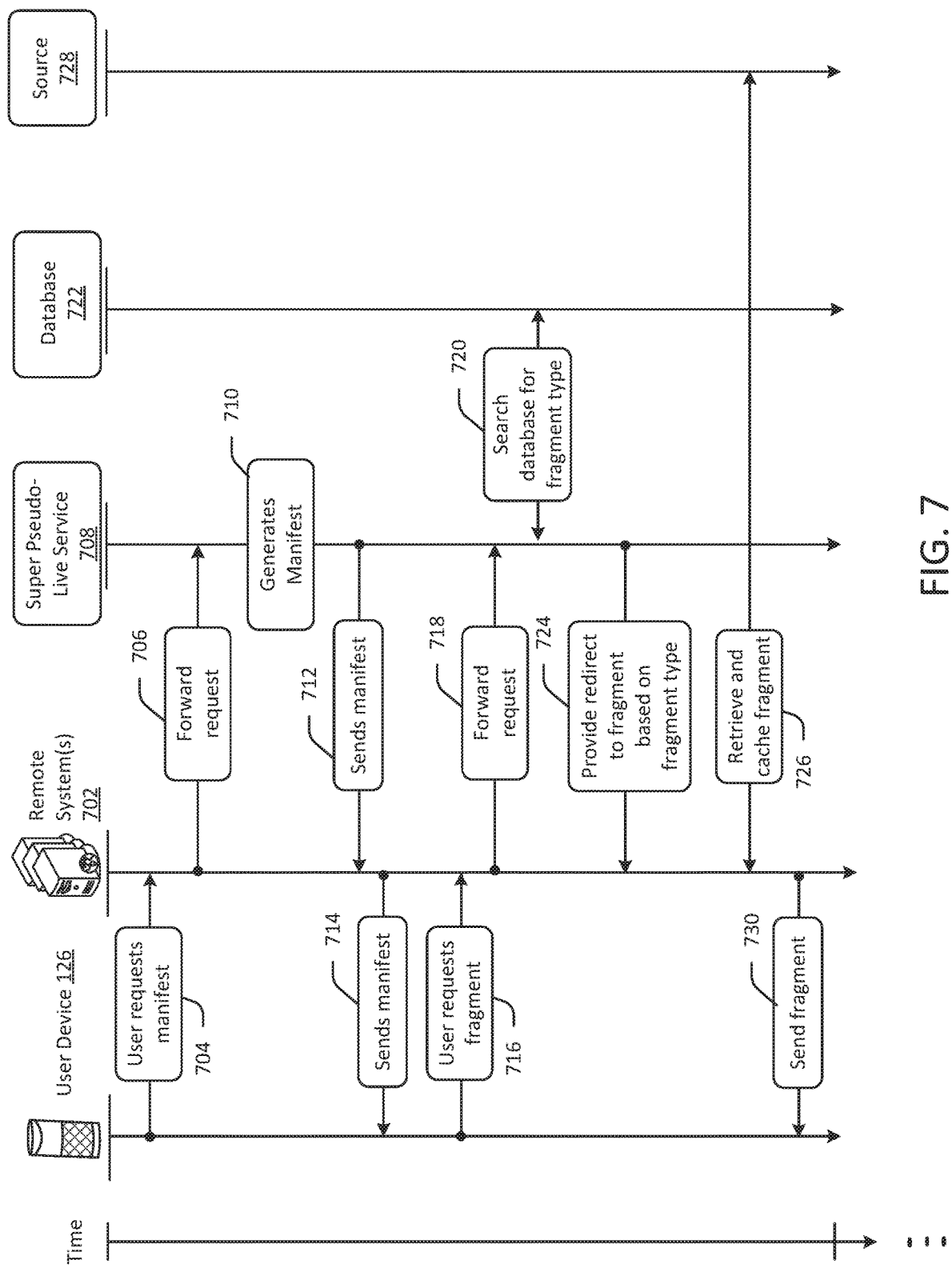
FIG. 7 is a hybrid system and process diagram of an example implementation for inserting secondary content into primary content data in live or pseudo-live media streams in accordance with one or more example embodiments of the disclosure.

The remote system 106 may include any suitable computing device capable of receiving a main content data feed and secondary content data, and integrating the main content data and secondary content data through a manifest manipulation, including, but not limited to, a remote server, a remote system having one or more computers, or the like, a desktop computer, an enterprise workstation, a laptop computer, or the like, or a smooth manifest system (e.g., the super pseudo-live service 708 depicted in FIG. 7). In some embodiments, the remote system 106 receives secondary content data 114 from a secondary content source 116. The secondary content data 114 can include any type of secondary content for insertion, such as, for example, an advertisement, a public service announcement or warning, censoring content, live or prerecorded commentary, or any other type of content to be integrated with or inserted into the main content data feed 104. In some embodiments, the secondary content source 116 may be populated with secondary content by a content distributor, an Internet provider, a local or federal government, an advertiser, or any other organization associated with media distribution, such as a regulatory body.

In some embodiments, the remote system 106 integrates the main content data feed 104 and the secondary content data 114 into a single combined feed 118. The single combined feed 118 can be generated in a variety of ways, such as through a fragment insertion 120. A fragment insertion is a type of manifest manipulation whereby one or more secondary content fragments, or pointers to one or more secondary content fragments, are inserted between two adjacent main content fragments, which may already be present in the manifest. In other embodiments, the combined feed 118 may be generated by a fragment replacement, whereby one or more fragments of the main content data feed 104 are replaced or otherwise overwritten, without remixing or repackaging, by one or more secondary content fragments.

In some embodiments, the remote system 106 separates the main content data feed 104 into one or more main content fragments 122. Similarly, in some embodiments, the remote system 106 separates the secondary content data 114 into one or more secondary content fragments 124. Once the main content fragments 122 and secondary content fragments 124 have been generated, the remote system 106 can insert the secondary content fragments 124 at the boundary between two adjacent main content fragments 122 to generate the combined data feed 118. As illustrated in FIG. 1, the remote system 106 inserts a secondary content fragment 124 between a second fragment $F_2$ and a third fragment $F_3$ of the main content fragments 122. While a single secondary content fragment is shown for ease of illustration, it is understood that any number of secondary content fragments may be inserted into a main content data feed. Moreover, the secondary content fragments need not be adjacent to each other, for example, in the case of two separate advertisements being inserted at two different points along a main content data feed.

In some embodiments, the combined data feed 118 may be transmitted or otherwise provided to one or more user devices, such as user device 126. The user device 126 may include any suitable computing device capable of receiving and processing data, such as a mobile device, smartphone, tablet, e-reader, wearable device, or the like; a desktop computer; a laptop computer; a content streaming device; a set-top box; or the like. As illustrated in FIG. 1, the user device 126 includes a display for presenting the combined data feed 118 to one or more users. As further illustrated in FIG. 1, the user device 126 displays main content 128 up to time Ti, a content insertion 130 (based on secondary content fragment(s) 124 at time $T_2$, and resumes playing the main content 128 at a time $T_3$.

Example embodiments of the disclosure provide a number of technical features or technical effects. For example, in accordance with example embodiments of the disclosure, certain embodiments of the disclosure may receive one or more data streams from one or more sources, chunk the data streams into one or more fragments, and integrate the one or more data streams using various manifest manipulation processes. In one example, a fragment insertion process may be used to interweave fragments from two or more sources. In another example, two or more fragments are merged through, for example, a byte offset and byte length manipulation. In yet another example, a smooth manifest system may provide one or more main content or secondary content redirects to a content delivery network for dynamically providing custom manifests to one or more end users.

Embodiments of the disclosure may improve the delivery of media content by allowing for the dynamic merging of two or more fragments in a manifest when necessary to improve a quality of service associated with the content delivery. Embodiments of the disclosure may improve computing efficiency by reducing the number of unique manifests which need to be generated by a content provider. Instead, a content delivery network or end user device can use provided fragment redirects to build, in real-time or near real-time, a unique manifest which may be personalized for each particular viewer or group of viewers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
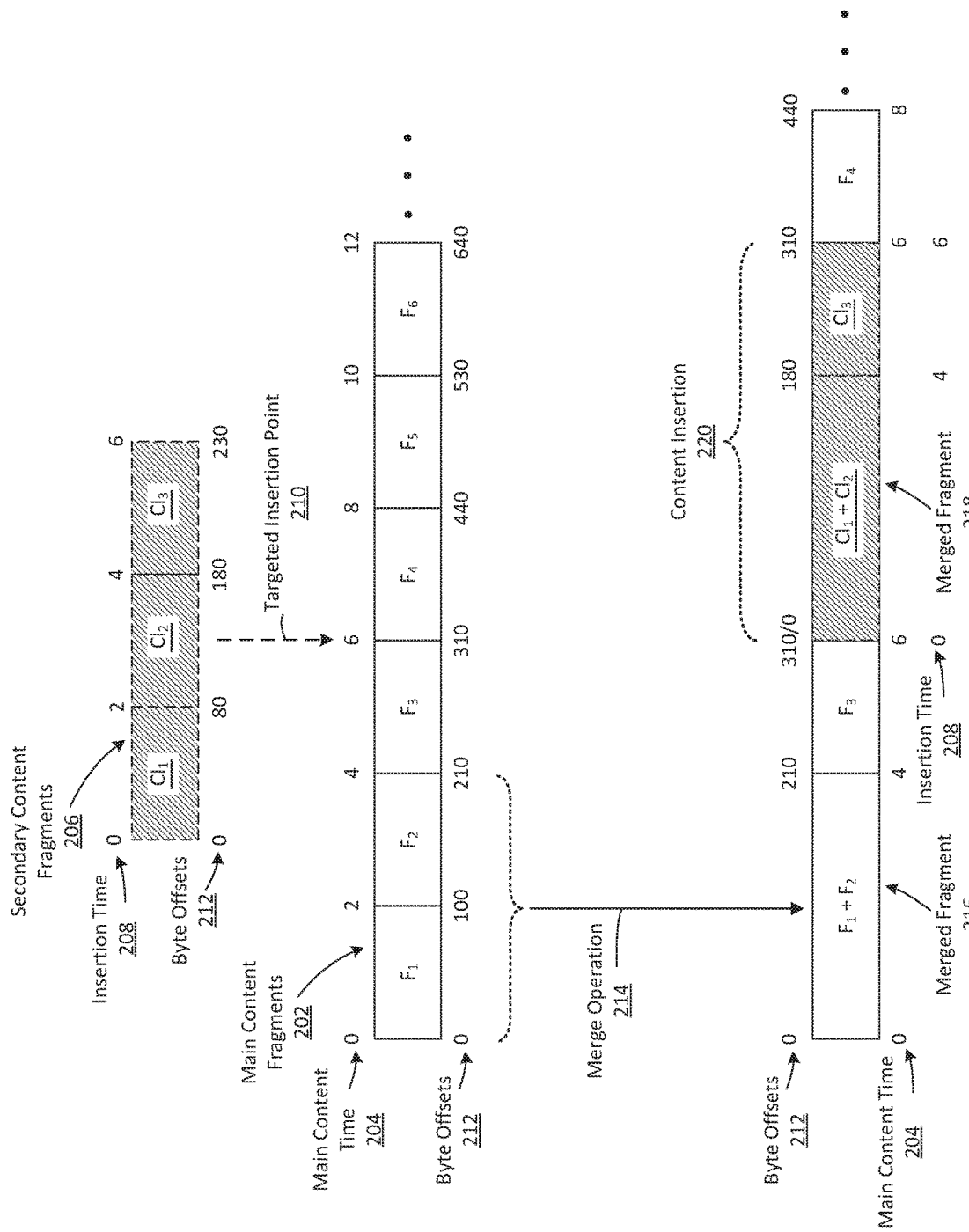
FIG. 2 is a schematic illustration of an exemplary manifest manipulation for inserting secondary content into primary content data in accordance with one or more example embodiments of the disclosure.

FIG. 2 schematically illustrates an example use case and an exemplary manifest manipulation for inserting secondary content into a main content data feed in accordance with one or more example embodiments of the disclosure. As discussed previously herein, a manifest may include one or more pointers to one or more fragments of a content feed. In some embodiments, each fragment may be accessed sequentially during playback, for example, by a user device (e.g., the user device 126 of FIG. 1).

In some embodiments, each fragment may be encoded to have a same duration. As illustrated in FIG. 2, for example, main content fragments 202 have been encoded to have a playback duration of two seconds. This results in a first fragment $F_1$ of the main content fragments 202 having a main content time 204 during playback that spans 0 to 2 seconds. Similarly, this results in a second fragment $F_2$ having a main content time 204 that spans 2 to 4 seconds, a third fragment $F_3$ having a main content time 204 that spans 4 to 6 seconds, and so on.

As further illustrated in FIG. 2, secondary content fragments 206 may also be encoded to have a playback duration of two seconds. This results in a first fragment $CI_1$ of the secondary content fragments 206 having an insertion time 208 during playback that spans 0 to 2 seconds. Similarly, this results in a second fragment $CI_2$ having an insertion time 208 that spans 2 to 4 seconds, a third fragment $CI_3$ having an insertion time 208 that spans 4 to 6 seconds, and so on. While the main content fragments 202 and secondary content fragments 206 are depicted as having a same duration (e.g., 2 seconds), it is understood that the insertion fragments 206 may be encoded to have a different playback duration.

In some embodiments, the choice to encode manifest fragments to have a particular playback duration may be based in part on a quality of service optimization. In other words, the playback duration may be adjusted (increased or decreased) to provide the best possible customer experience, by reducing lag, frame shudder, etc. In some embodiments, the best possible viewing experience is provided by leaving the encoded playback duration of the manifest fragments untouched. For example, fragments encoded to have a two second duration may not be modified if a two second duration is known to provide the best possible viewing experience.

In other embodiments, however, the best possible viewing experience may be provided by re-encoding (also referred to as merging) respective main content fragments 202 and respective secondary content fragments 206 to have a longer playback duration. For example, an end user viewing experience may be improved by merging successive pairs of the main content fragments 202 and the successive pairs of the secondary content fragments 206 to provide fragments having a playback duration of four seconds, rather than two seconds.

Re-encoding the fragments to have a longer playback duration, however, can result in a corresponding decrease in content insertion precision. Content insertion precision refers to the playback time accuracy by which secondary content may be inserted into primary content. For example, a content insertion precision of two seconds means that an insertion of secondary content (an insertion of secondary content is sometimes referred to herein as a secondary content insertion) can be made within one second of a targeted insertion point. This decrease in content insertion precision is due to the fact that secondary content insertions should be made at a fragment boundary. In other words, secondary content may be inserted before or after an existing fragment. Consequently, if the duration of the existing fragments are increased, for example, from two to four seconds, the distance between adjacent fragment boundaries increases, reducing content insertion precision. As a result, there is a balance between content insertion accuracy and fragment encoding duration.

As illustrated in FIG. 2, the secondary content fragments 206 are associated with a targeted insertion point 210. In this case, the targeted insertion point 210 is between the third fragment $F_3$ and the fourth fragment $F_4$ of the main content fragments 202, at a main content time 204 of six seconds. While the targeted insertion point 210 is depicted as falling on a fragment boundary, it is understood that target insertion points generally may or may not fall on a fragment boundary. In cases where a target insertion point does not fall on a fragment boundary, the target insertion point may be rounded up or down to the nearest fragment boundary. If the target insertion point lies exactly between two fragment boundaries, default rules can be used to determine the rounding. For example, a default rule may result in rounding down a target insertion point.

In some embodiments, a new manifest manipulation technique may be employed that allows for the smart merging of some fragments in a manifest, while other fragments are left untouched. In some embodiments, a manifest manipulation may include modifying the byte offsets and byte lengths of some of the fragments addressed by the manifest. In some embodiments, only fragments that can be merged without affecting a secondary content insertion are selected for re-encoding. For example, if pair of fragments are not selected for re-encoding if a potential merge of the fragments which would result in a new fragment having a duration which overlaps the secondary content.

As illustrated in FIG. 2, for example, the main content fragments 202 include byte offsets 212. For example, the first fragment $F_1$ begins at a byte offset of 0 and ends at a byte offset of 100. The secondary content fragments 206 similarly include byte offsets 212. For example, the first fragment $CI_1$ of the secondary content fragments 206 begins at a byte offset of 0 and ends at a byte offset of 80. The length between the starting and ending offsets of a fragment defines the byte length of the fragment. For example, the byte length of the first fragment $F_1$ is 100. The byte length for a given fragment is a function of the data complexity of the fragment. For example, a video fragment for a completely black scene will have a shorter byte length than a video fragment for a visually complicated scene.

In one embodiment, one or more fragment pairs of the main content fragments 202 and the secondary content fragments 206 may be merged after determining the targeted insertion point 210. In this manner, each fragment pair can be checked against the targeted insertion point 210 to determine an impact on any secondary content insertions. As illustrated in FIG. 2, for example, the first fragment $F_1$ and the second fragment $F_2$ of the main content fragments 202 may be merged during a merge operation 214 without affecting the targeted insertion point 210. The resulting merged fragment 216 is a combination of the first fragment $F_1$ and the second fragment $F_2$ of the main content fragments 202. Similarly, the first fragment CI' and the second fragment $CI_2$ of the secondary content fragments 206 may be merged to provide a merged fragment 218.

In some embodiments, the merged fragments 216 and 218 are generated by merging the byte offsets and byte lengths associated with the pre-merged fragments. For example, the merged fragment 216 may include a starting byte offset of 0, corresponding to the starting byte offset of the first fragment $F_1$, and an ending byte offset of 210, corresponding to the ending byte offset of the second fragment $F_2$. Accordingly, the merged fragment 216 will include the entire byte length of the first fragment $F_1$ and the second fragment $F_2$.

As discussed previously herein, some fragment pairs may not be merged, due to their effect on a targeted insertion point. As illustrated in FIG. 2, for example, the third fragment $F_3$ and the fourth fragment $F_4$ of the main content fragments 202 are not merged because merging these fragments will result in a combined fragment having a total playback duration which will overlap the start of a secondary content insertion 220 placed at the targeted insertion point 210.

This process continues until a merge decision (e.g., a decision on whether to merge a given fragment pair) has been made for every fragment pair in both the main content fragments 202 and the secondary content fragments 206. For example, every available fragment pair after the secondary content insertion 220 can be merged, assuming that the secondary content insertion 220 is the only or final secondary content insertion. In this manner, content insertion precision is not diminished due to the increase in some fragment durations. For example, because the third fragment $F_3$ may be left untouched at a playback duration of two seconds, the targeted insertion point 210 can maintain two second precision, even though many of the other fragments in the manifest have been merged (e.g., the merged fragments 216 and 218).

This new manifest manipulation technique based on the smart merging of some fragments in a manifest through byte offset and byte length editing advantageously allows for a greatly improved customer experience. For example, because targeted insertion points are maintained at a known precision (e.g., a two second precision), a system using this manifest manipulation technique can consistently provide secondary content insertion indicators to users, such as black frames around an ad break, as a visual indicator to users that a secondary content insertion is being presented. In systems that cannot maintain insertion precision, these insertion indicators may not reliably align with a secondary content insertion.

Figure 3:
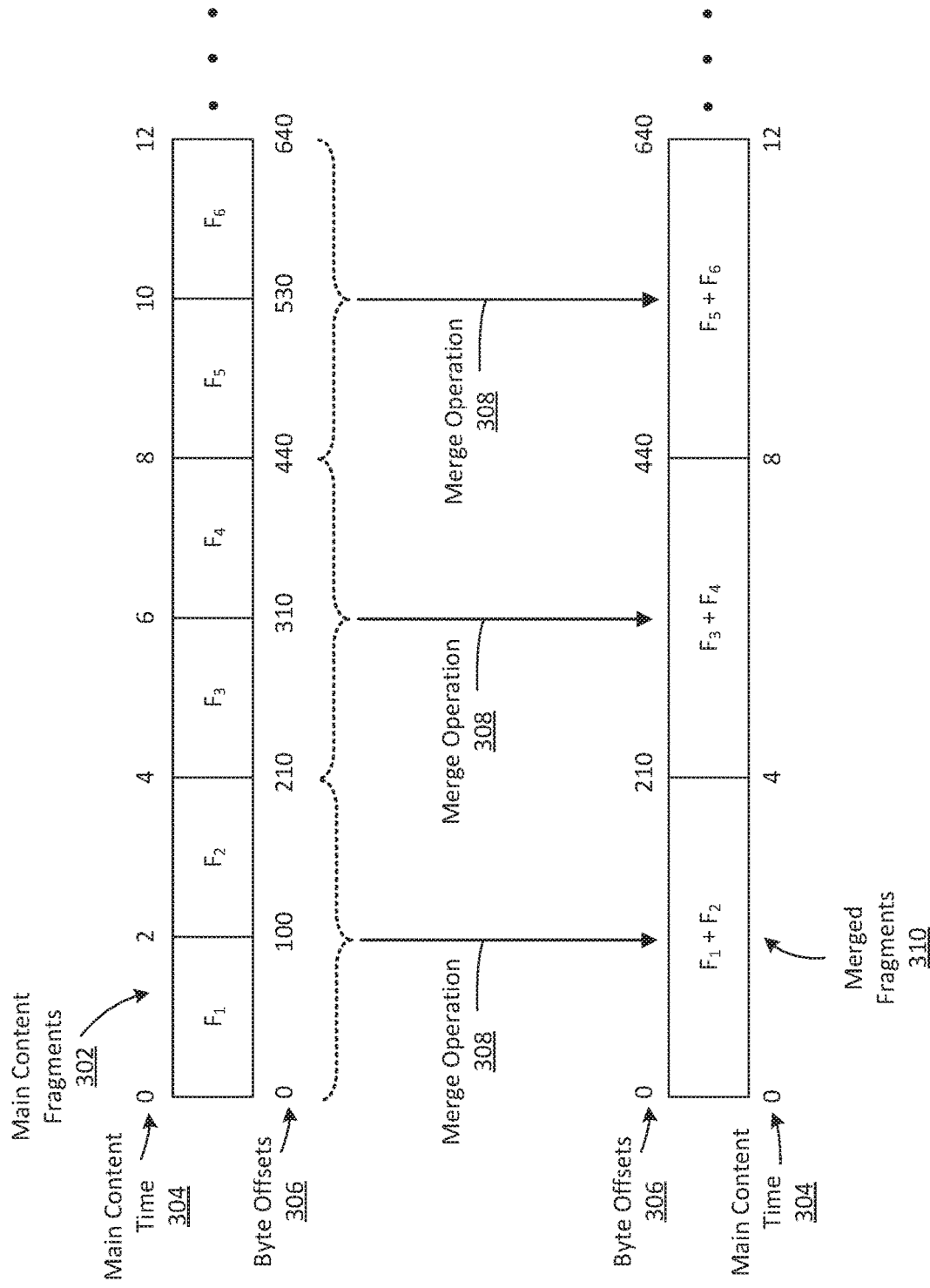
FIG. 3 is a schematic illustration of an exemplary manifest manipulation that does not include a content insertion in accordance with one or more example embodiments of the disclosure.

FIG. 3 schematically illustrates an example use case and an exemplary manifest manipulation that does not include a dynamic secondary content insertion in accordance with one or more example embodiments of the disclosure. As discussed previously herein, a manifest may include one or more pointers to one or more fragments of a content feed. In some embodiments, each fragment may be accessed sequentially during playback, for example, by a user device (e.g., the user device 126 of FIG. 1).

As illustrated in FIG. 3, main content fragments 302 have been encoded to have a playback duration of two seconds. This results in a first fragment $F_1$ of the main content fragments 302 having a main content time 304 during playback that spans 0 to 2 seconds. Similarly, this results in a second fragment $F_2$ having a main content time 304 that spans 2 to 4 seconds, a third fragment $F_3$ having a main content time 304 that spans 4 to 6 seconds, and so on.

As discussed with reference to FIG. 2, the choice to encode manifest fragments to have a particular playback duration may be based in part on a quality of service optimization. In some embodiments, the best possible viewing experience may be provided by re-encoding (also referred to as merging) the main content fragments 302 to have a longer playback duration. For example, an end user viewing experience may be improved by merging successive pairs of the main content fragments 302 to provide merged fragments having a playback duration of four seconds, rather than two seconds.

In some embodiments, such as the embodiment depicted in FIG. 3, there may be no secondary content insertion. Because there is no secondary content insertion, there is no targeted insertion point. Consequently, all fragment pairs of the main content fragments 302 can be merged without worrying about the impact on a secondary content insertion.

In some embodiments, the manifest manipulation technique discussed with respect to FIG. 2 may be employed to merge all available fragment pairs. In some embodiments, a manifest manipulation may include modifying the byte offsets and byte lengths of all available fragment pairs addressed by a manifest.

As illustrated in FIG. 3, for example, the main content fragments 302 include byte offsets 306. For example, the first fragment $F_1$ begins at a byte offset of 0 and ends at a byte offset of 100. As discussed previously herein, the length between the starting and ending offsets of a fragment defines the byte length of the fragment, which in turn is governed by the data complexity of the respective fragment. For example, the byte length of the first fragment $F_1$ is 100.

In one embodiment, all available fragment pairs of the main content fragments 302 are merged after determining that a secondary content insertion is not needed. In this manner, the quality of service associated with a playback of the fragments can be improved without worrying about the impact on any secondary content insertions. As illustrated in FIG. 3, for example, the first fragment $F_1$ and the second fragment $F_2$ of the main content fragments 302 may be merged during a merge operation 308. The resulting merged fragment $F_1+F_2$ of the merged fragments 310 is a combination of the first fragment $F_1$ and the second fragment $F_2$ of the main content fragments 302. Similarly, the third fragment $F_3$ and the fourth fragment $F_4$ may be merged to provide a merged fragment $F_3+F_4$, and so on.

In some embodiments, the merged fragments 310 are generated by merging the byte offsets and byte lengths associated with the pre-merged fragments. For example, the merged fragment $F_1+F_2$ of the merged fragments 310 may include a starting byte offset of 0, corresponding to the starting byte offset of the first fragment $F_1$, and an ending byte offset of 210, corresponding to the ending byte offset of the second fragment $F_2$. Accordingly, the merged fragment $F_1+F_2$ will include the entire byte length of the first fragment $F_1$ and the second fragment $F_2$.

Figure 4:
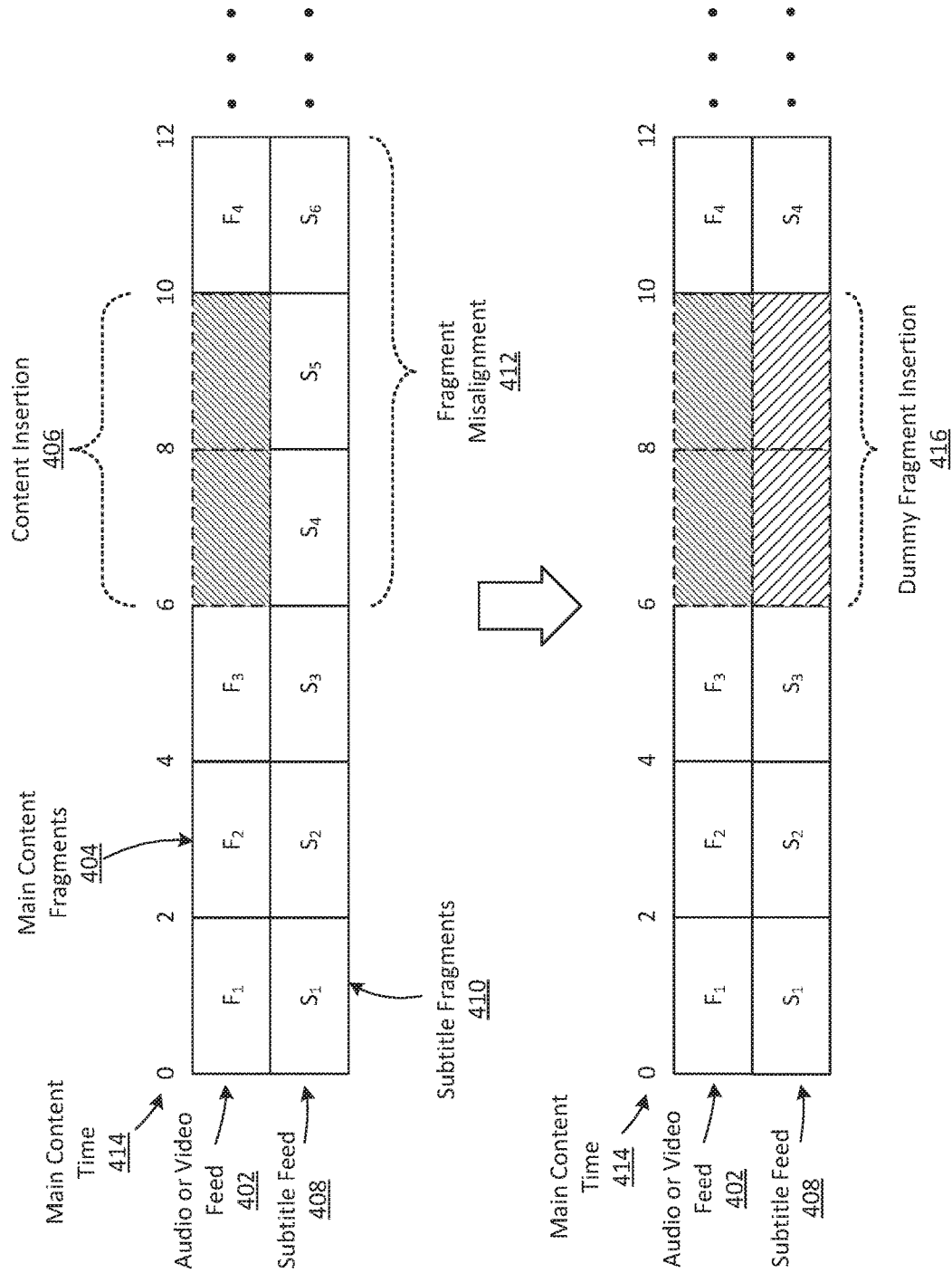
FIG. 4 is a schematic illustration of an example manifest manipulation of a subtitle feed to maintain fragment synchronization with an audio or video feed in accordance with one or more example embodiments of the disclosure.

FIG. 4 schematically illustrates an example use case and an exemplary manifest manipulation of a secondary feed to maintain fragment synchronization with an audio or video feed in accordance with one or more example embodiments of the disclosure. As discussed previously herein with respect to FIG. 1, a secondary content insertion can be integrated into a main content feed. In some embodiments, the main content feed may be an audio or video feed. As illustrated in FIG. 4, for example, an audio or video feed 402 having main content fragments 404 may include a secondary content insertion 406.

The secondary content insertion 406 may cause a fragment misalignment between the audio or video feed 402 and another related feed, such as a subtitle feed 408, which may be meant to be played concurrently with the audio or video feed 402. This misalignment may result when the secondary content insertion 406 does not include subtitle data, such as the case for an advertisement that does not include any encoded subtitles.

As illustrated in FIG. 4, for example, the audio or video feed 402 may include four or more fragments $F_1$, $F_2$, $F_3$, and $F_4$, as well as the secondary content insertion 406, while the subtitle feed 408 may include six or more fragments $S_1$, $S_2$, $S_3$, $S_4$, $S_5$, and $S_6$ of the subtitle fragments 410. As further illustrated in FIG. 4, the secondary content insertion 406 has caused a fragment misalignment 412, which begins at six seconds into the main content time 414. For example, once the secondary content insertion 406 ends, the audio or video feed 402 resumes with the fourth fragment $F_4$. By this time, however, the subtitle feed 408 may be playing the sixth subtitle fragment $S_6$.

In some embodiments, a dummy fragment insertion 416 including one or more dummy fragments may be inserted into the subtitle feed 408 to correct the fragment misalignment 412. As illustrated in FIG. 4, for example, the dummy fragment insertion 416 may include two dummy fragments spanning the main content time 414 between six and ten seconds. As further illustrated in FIG. 4, the fragments $F_4$ and $S_4$ following the dummy fragment insertion 416 are properly aligned.

In some embodiments, the subtitle feed 408 may be initially encoded as a single contiguous file without byte offsets and byte ranges. This arrangement may be suitable to cases where the audio or video feed 402 does not include a secondary content insertion. In some embodiments, however, the audio or video feed 402 does include a secondary content insertion, such as the secondary content insertion 406. In that case, the use of a subtitle feed 408 encoded as a single file will result in a fragment misalignment.

In some embodiments, the fragment misalignment caused by a single file subtitle feed 408 may be avoided by dynamically fragmenting the subtitle feed 408 into fragments having a same duration as the main content fragments 404 of the audio or video feed 402. In some embodiments, the subtitle feed 408 may be dynamically fragmented by generating byte offsets and byte lengths such that the subtitle feed 408 includes the same number of fragments as the audio or video feed 402. Once the subtitle feed 408 is fragmented, one or more dummy fragments can be inserted into the subtitle feed 408 as previously described.

In some embodiments, a manifest manipulation system will check a main content feed prior to making a decision to dynamically fragment a subtitle feed. For example, if the main content feed does not include a secondary content insertion, the subtitle feed can be left as a single contiguous file. Such an approach is highly flexible, providing for subtitle feed fragmentation and dummy fragment insertions when necessary, and otherwise allowing the subtitle feed to remain as a single file, improving caching efficiency.

While the secondary feed is depicted in FIG. 4 as a subtitle feed, it is understood that fragment alignments can be similarly handled in other secondary feeds, such as, for example, in a trickplay feed. In some embodiments, a trickplay feed may be fragmented if necessary, and two or more trickplay fragments may be merged into a single fragment according to one or more embodiments, to keep a one-to-one segment mapping (fragment alignment) between the trickplay feed and the audio or video feed 402, or the subtitle feed 408.

Figure 5:
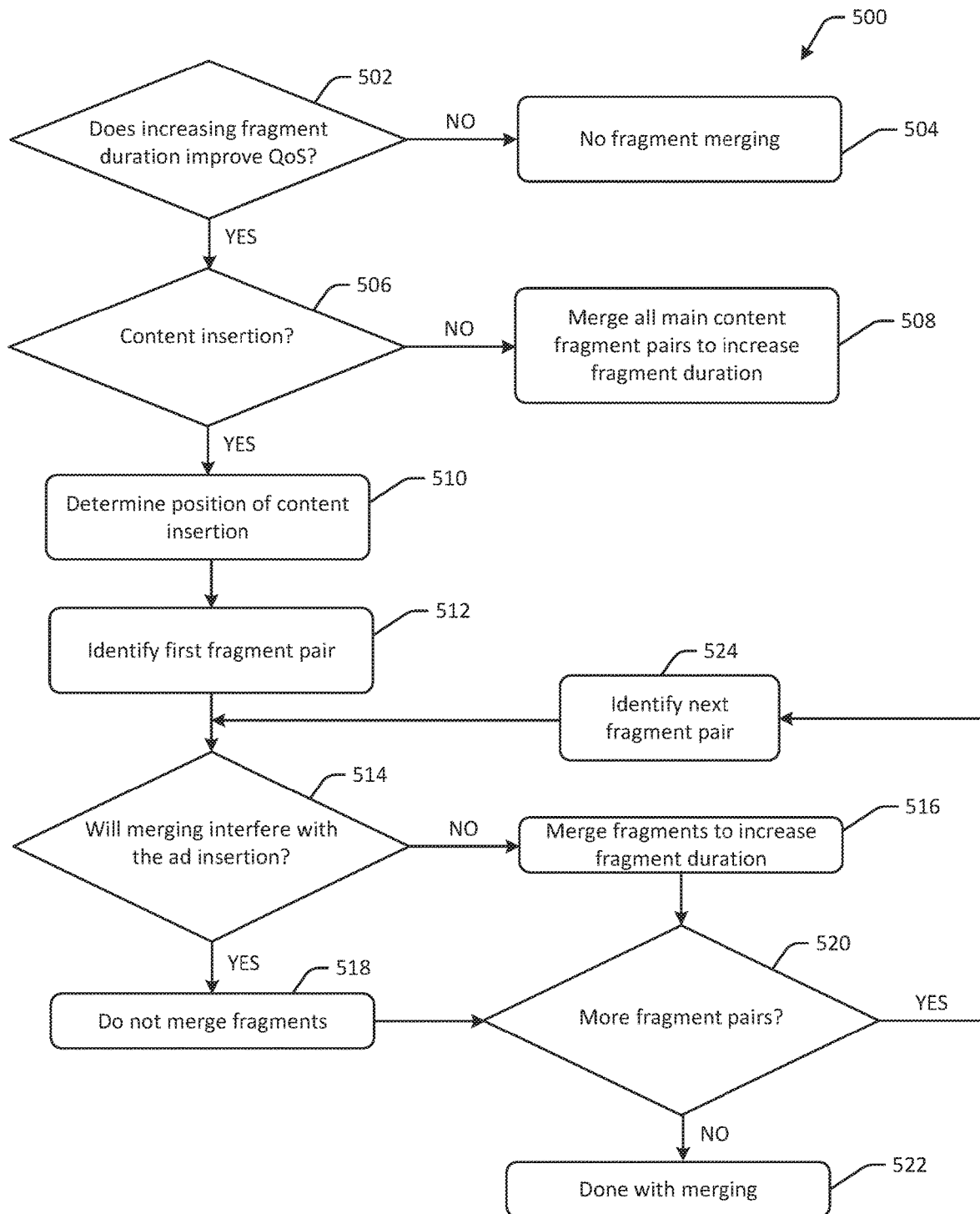
FIG. 5 is a schematic illustration of an example process flow for providing a dynamic manifest manipulation for inserting secondary content into primary content data in accordance with one or more example embodiments of the disclosure.

FIG. 5 schematically illustrates an example use case and an example process flow 500 for providing a dynamic manifest manipulation for inserting secondary content into primary content data in accordance with one or more example embodiments of the disclosure. Some or all of the blocks of the process flow 500 may be performed in a distributed manner across any number of devices. The operations of the process flow 500 may be optional and may be performed in a different order.

At block 502, a quality of service determination may be made with respect to the playback of a content feed according to one or more embodiments. In some embodiments, the quality of service determination may include determining whether an increase in a fragment duration will improve the quality of service. If the quality of service will not be improved by a fragment merge, the process continues to block 504. If the quality of service will be improved by a fragment merge, the process continues to block 506.

At block 504, no merging of fragments occurs. Instead, the fragments are left in their originally encoded state. For example, the fragments may be encoded to have a playback duration of two seconds. If a secondary content insertion is required in this scenario, the secondary content fragments can be integrated into the main content fragments according to one or more embodiments.

At block 506, a determination may be made as to whether a secondary content insertion is required. If a secondary content insertion is not required, the process continues to block 508. If a secondary content insertion is required, the process continues to block 510.

At block 508, the quality of service will be improved by a fragment merge, and there is no secondary content insertion. Consequently, all fragment pairs across the entire main content can be merged according to one or more embodiments without worrying about the impact on a secondary content insertion.

At block 510, the quality of service will be improved by a fragment merge, but there will be a secondary content insertion. In this scenario, the position of the secondary content insertion should be determined. This secondary content insertion position can be determined according to one or more embodiments, such as in a similar manner as the targeted insertion point 210 depicted in FIG. 2. In some embodiments, the secondary content insertion positon may be rounded up or down to a fragment boundary, according to one or more embodiments.

At block 512, a first fragment pair may be identified. The first fragment pair can be identified according to one or more embodiments, such as in a similar manner as the first and second fragments $F_1$ and $F_2$ of the main content fragments 202 depicted in FIG. 2.

At block 514, the first fragment pair may be checked to determine whether a merge of the pair will impact the secondary content insertion. The first fragment pair can be checked for secondary content insertion interference according to one or more embodiments, such as in a similar manner as the first and second fragments $F_1$ and $F_2$ of the main content fragments 202 depicted in FIG. 2. If merging the fragment pair will not interfere with the secondary content insertion, the process continues to block 516. If merging the fragment pair will interfere with the content inversion, the process continues to block 518.

At block 516, the fragments are merged according to one or more embodiments. In one embodiment, the fragments are merged using a manifest manipulation of byte offsets and byte ranges, as discussed previously herein. In one embodiment, the fragments have a same initial duration, for example two seconds, and the resulting merged fragment has a new, longer duration, for example four seconds.

At block 518, the fragments are not merged due to the potential interference with the secondary content insertion. As discussed previously herein, merging the fragments may result in a combined fragment having a duration that would overlap with a portion of the secondary content insertion.

From block 516 or block 518, the process continues to block 520. At block 520, the main content feed and secondary content insertion feed are check for additional fragment pairs. If there are no additional fragment pairs to check, the process continues to block 522 and the merging operation is complete. If there are additional fragment pairs to check, the process continues to block 524.

At block 524, a next fragment pair may be identified. The next fragment pair can be identified according to one or more embodiments, such as in a similar manner as the third and fourth fragments $F_3$ and $F_4$ of the main content fragments 202 depicted in FIG. 2.

After block 524, the process continues to block 514, where the process repeats for the next fragment pair. In this manner, the process continues until a fragment merge decision has been made for all possible fragment pairs.

Figure 6:
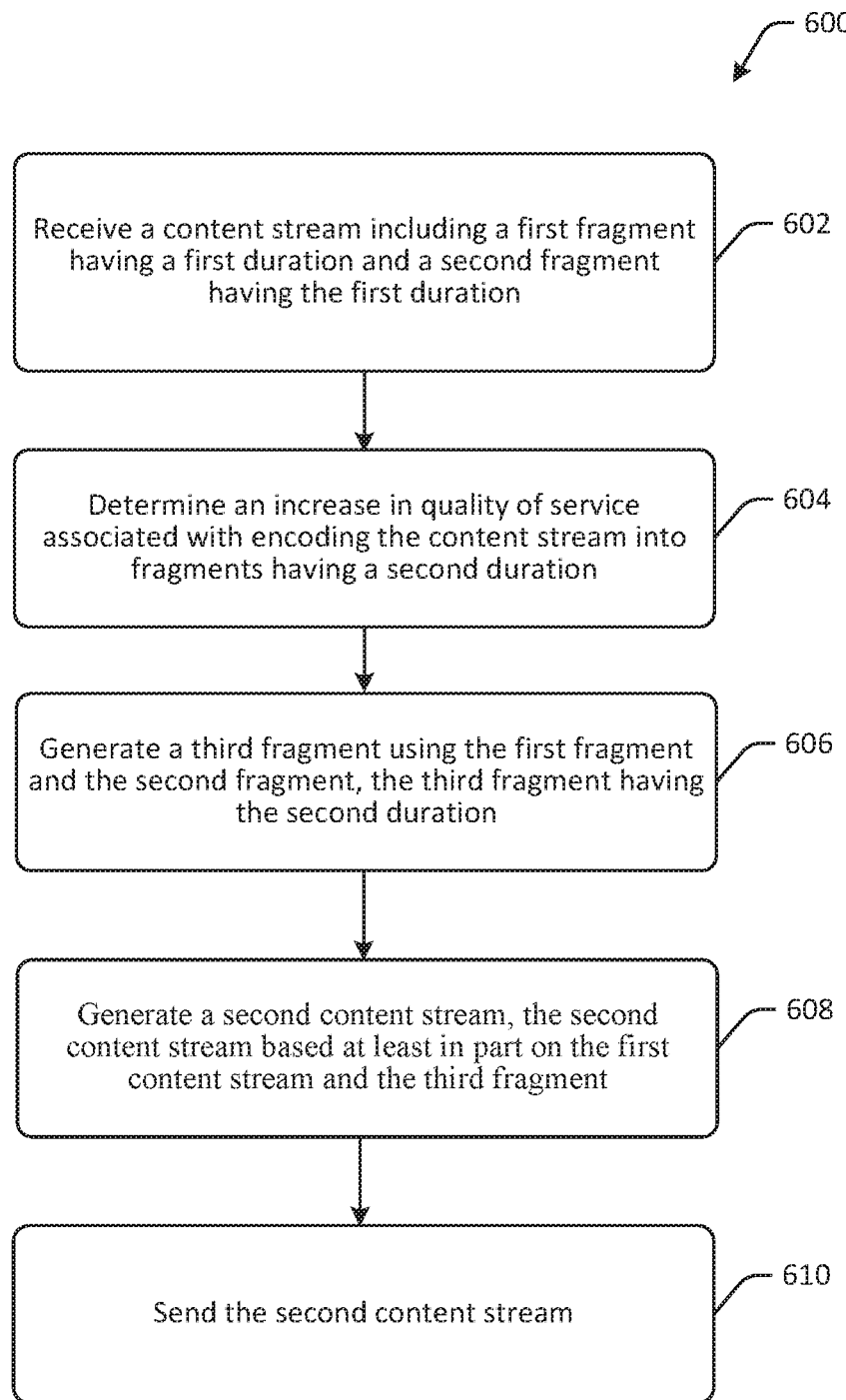
FIG. 6 is a schematic illustration of an example process flow in accordance with one or more example embodiments of the disclosure.

FIG. 6 schematically illustrates an example use case and an example process flow 600 in accordance with one or more example embodiments of the disclosure. Some or all of the blocks of the process flow 600 may be performed in a distributed manner across any number of devices. The operations of the process flow 600 may be optional and may be performed in a different order.

At block 602, a first content stream may be received according to one or more embodiments. In some embodiments, the first content stream may include a first fragment having a first duration and a second fragment having the first duration. The first content stream may be derived from a live stream, such as the live stream 108 depicted in FIG. 1, or from a VOD database, such as the VOD database 110 depicted in FIG. 1.

At block 604, a check may be made according to one or more embodiments to determine whether an improved quality of service can be achieved by encoding the first content stream into fragments having a second duration. In some embodiments, the second duration is longer than the first duration.

At block 606, a third fragment is generated based at least in part on the first fragment and the second fragment. In some embodiments, the third fragment has a duration equal to the second duration. In some embodiments, the first fragment comprises a first byte offset and a first byte length and the second fragment comprises a second byte offset and a second byte length.

In some embodiments, merging the first fragment and the second fragment further comprises determining, by one or more computer processors coupled to memory, a third byte offset based at least in part on the first byte offset and the second byte offset. In some embodiments, the third byte length may be based at least in part on the first byte length and the second byte length. In some embodiments, a third fragment may be generated based at least in part on the third byte offset and the third byte length.

In some embodiments, setting the third byte offset comprises setting the third byte offset equal to the first byte offset, and determining the third byte length comprises adding the first byte length to the second byte length.

In some embodiments, a secondary content may be identified for insertion into the first content stream according to one or more embodiments. In some embodiments, the secondary content may include a fourth fragment having a duration of two seconds and a fifth fragment having a duration of two seconds.

In some embodiments, the fourth fragment and the fifth fragment of the secondary content are merged into a sixth fragment according to one or more embodiments. In some embodiments, the sixth fragment includes the second duration. In some embodiments, the sixth fragment may be inserted into the first content stream.

In some embodiments, a targeted time of the first content stream to insert the secondary content may be determined. In some embodiments, the secondary content may be inserted after the second fragment based at least in part on the targeted time.

In some embodiments, a seventh fragment of the first content stream may be identified. The seventh fragment may be between the third fragment of the first content stream and the secondary content. In some embodiments, a determination may be made not to merge the seventh fragment with a next fragment based at least in part on the targeted time. For example, it may be determined that merging the seventh fragment with the next fragment will result in a combined fragment having a duration that overlaps the targeted time.

In some embodiments, a fragment may be identified that follows a last fragment of the second content stream. In some embodiments, determining a byte offset of the fragment comprises setting the byte offset equal to a total of the byte offset and the byte length of the last fragment.

In some embodiments, the first content stream and the secondary content comprise video or audio streams, as well as a subtitle stream associated with the video or audio streams. In one embodiment, the subtitle stream may be segmented into fragments according to one or more embodiments. In one embodiment, one or more dummy fragments are inserted into the subtitle stream based at least in part on the second content stream.

In some embodiments, a trickplay stream may be associated with the video or audio streams. The trickplay stream may be encoded into fragments having a first duration. In some embodiments, a first fragment and a second fragment of the trickplay stream are merged into a third fragment of the trickplay stream based at least in part on the third fragment of the first content stream. In some embodiments, the third fragment of the trickplay stream may include the second duration.

At block 608, a second content stream is generated based at least in part on the first content stream and the third fragment. In some embodiments, the second content stream is the first content stream after generating the third fragment by merging the first fragment and the second fragment.

At block 610, the second content stream having the third fragment may be sent to a device (e.g., the user device or another device) according to one or more embodiments. The user device may be, for example, the user device 126 depicted in FIG. 1.

FIG. 7 schematically illustrates an example use case and an exemplary hybrid system and process diagram for inserting secondary content into primary content data in live or pseudo-live media streams in accordance with one or more example embodiments of the disclosure. As discussed previously herein, a manifest may include one or more pointers to one or more fragments of a content feed. In some embodiments, each fragment may be accessed sequentially during playback, for example, by a user device (e.g., the user device 126 of FIG. 1).

In some implementations, streaming content may be broken down into fragments, and a live-style manifest may be generated that contains pointers or fragment references that can be used by a user device to retrieve each fragment. With a live-style manifest, there may be no known ending point to the media content and no known "last" fragment. Instead, the fragments in a live-style manifest are constantly updated as new streaming fragments are encoded by the content source. Because the fragments in a live-style manifest change over time, it can be difficult to position or otherwise locate the secondary content insertion between the correct main content fragments. Moreover, it can be challenging to provide targeted content to specific users, as a unique live-style manifest would need to be generated for each targeted user or group of users. This requirement for unique manifests may be computationally expensive, and may be infeasible in some contexts having a very large number of separately targeted users.

Conventional media streaming platforms rely on a live-style manifest to provide streaming content to media players. These media players can include various user devices, such as the user device 126, sometimes referred to as pseudo-live players. These user devices may include any suitable computing device capable of receiving, transmitting, and/or generating data including, but not limited to, a mobile device such as a smartphone, tablet, e-reader, wearable device, or the like; a desktop computer; a laptop computer; a content streaming device; a set-top box; or the like. In some implementations, however, dynamic secondary content insertion may be complicated by the fact that some user devices cannot read or play a live-style manifest.

As illustrated in FIG. 7, user device 126 are communicatively coupled to one or more remote systems 702 for receiving various media content. The remote systems 702 are sometimes referred to as edge servers, content delivery networks (CDNs), or origin servers. At block 704, a user device 126 requests a manifest from the remote system 702. At block 706, the remote system 702 forwards this manifest request to a super pseudo-live service 708.

The super pseudo-live service 708 serves two purposes. First, the super pseudo-live service 708 may convent a live-style manifest to a VOD-style manifest (sometimes referred to as a dummy VOD or pseudo-VOD manifest). This capability may be particularly useful in embodiments where the user device 126 cannot play a live-style manifest. The dummy VOD manifest may be similar to a true VOD manifest, except that fragment data in the dummy VOD manifest may only be available for a limited period of time (sometimes referred to as an access window). For example, a first fragment in the dummy VOD manifest may only be available for 1 minute, or 5 minutes. Over time, new fragments are added to the dummy VOD, and old fragments are removed or overwritten. In this manner, fragments in the dummy VOD are continuously updated to match the live-style manifest. From the perspective of the user device 126, fragment requests based on a dummy VOD manifest are limited by the access window. In other words, the user device 126 can only request fragments that are currently available. This is in contrast to a true VOD manifest, having a predetermined end point. In a true VOD manifest, user devices may request any fragment at any time, because all of the fragments are known ahead of time. In other words, a true VOD manifest may include all fragments associated with the VOD.

The second purpose of the super pseudo-live service 708 is to provide appropriate main content and insertion content fragment redirects to the remote system 702. The use of fragment redirects allows for a unique manifest to be efficiently generated for a given customer viewing session (based on, e.g., a customer ID or session ID). Without these redirects, it may become prohibitively expensive in terms of computing power and cost to create all of the necessary customized manifests with prepackaged (encoded) main and targeted ad fragments.

For example, in some embodiments, a single manifest may be generated for all users. In this scenario, the overhead associated with generating the VOD-style manifest may be minimal. In other embodiments, however, many manifests may be generated for a single content stream. For example, manifests can be generated to target one or more users, based on, for example, a customer ID or session ID associated with the content streaming, a user account, or the user device 126. In some embodiments, manifests are generated for various sets of customers. For example, a first manifest may be generated for all adult females ages 20 to 30, and a second manifest may be generated for all teenagers. Each of these manifests may be provided to a relatively large number of users, such as, for example, hundreds or thousands of customers.

In the extreme case, however, a unique manifest may be generated for each customer, for each viewing session. In this scenario, a large number of manifests are required for a given content source, and it can quickly become prohibitively expensive in terms of computing power and cost to create all of the required manifests having prepackaged (encoded) main content and secondary content insertions (e.g., targeted ad fragments for each customer). The use of fragment redirects circumvents this issue by allowing the one or more remote systems 702 and/or the user device 126 to effectively generate their own manifests.

At block 710, the super pseudo-live service 708 convents a live-style manifest to a VOD-style manifest according to one or more embodiments. In some embodiments, the generated VOD-style manifest may be a smooth streaming manifest. A smooth streaming manifest refers to a manifest having fragments which have stripped down headers. For example, a CODEC can be removed from the fragments, as CODEC data can instead be more efficiently supplied directly by the manifest itself.

At block 712, the super pseudo-live service 708 sends this VOD-style manifest to the remote system 702. At block 714, the remote system 702 distributes the VOD-style manifest to the user device 126.

In some embodiments, the user device receives the VOD-style manifest and begins sequentially requesting, at block 716, the fragments associated with the manifest pointers from the remote system 702. At block 718, the fragment request may be forwarded to the super pseudo-live service 708.

In one embodiment, the super pseudo-live service 708 searches, at block 720, a local or remote database 722 for fragment data. The fragment data may include a fragment index, a customer ID, a session ID, a fragment type, and a fragment source location. In some embodiments, the fragment request from the user device 126 may include a customer ID and a fragment index, and the super pseudo-live service 708 searches the database 722 for the matching fragment data, and specifically, for the fragment type of the requested fragment. In some embodiments, the fragment type indicates whether the requested fragment is a main content fragment, or a secondary content fragment. Once the fragment type is identified, the super pseudo-live service 708 may provide, at block 724, a redirect to the remote system 702. The redirect may include all of the information required to locate and retrieve the requested fragment from the relevant source. For example, if the fragment is a main content fragment, the redirect will reference the main content data source. Alternatively, if the fragment is a secondary content fragment, the redirect will reference a secondary content insertion data source. In some embodiments, the redirect may be an HTTP redirect.

At block 726, the remote system 702 may retrieve the requested fragment from a source 728 based on the redirect provided by the super pseudo-live service 708. In some embodiments, the remote system 702 caches this fragment in local storage. In some embodiments, the fragment remains cached until the user device is ready to receive the fragment (e.g., just in time fragment delivery).

At block 730, the remote system 702 supplies the user device 126 with the requested fragment. At this point, the process returns to block 716, as the user device 126 requests other, additional fragments.

Figure 8:
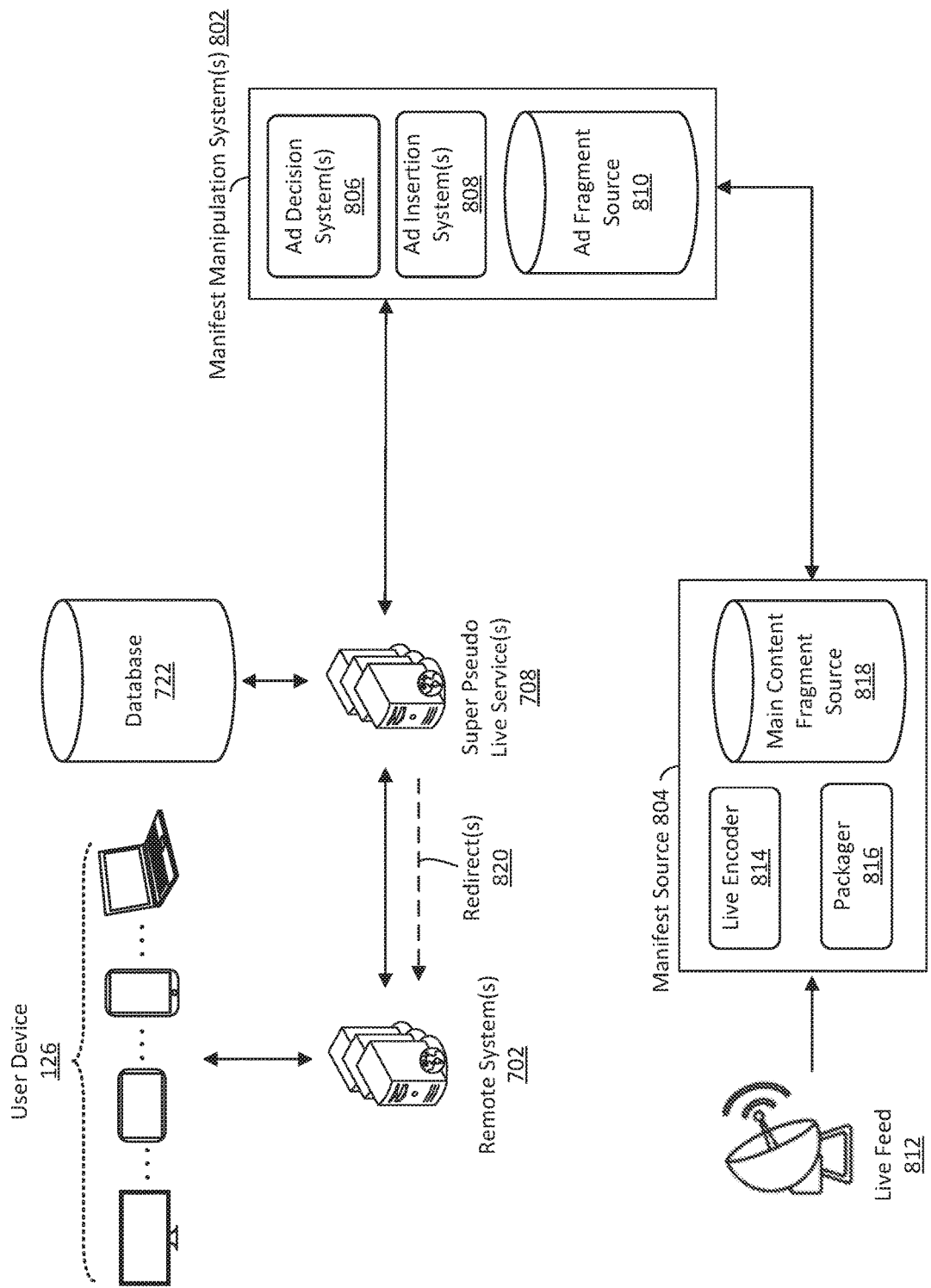
FIG. 8 is a schematic illustration of an example system diagram for inserting secondary content into primary content data into a live or pseudo-live media stream in accordance with one or more example embodiments of the disclosure.

FIG. 8 schematically illustrates an example use case and an exemplary system diagram for inserting secondary content into primary content data in live or pseudo-live media streams in accordance with one or more example embodiments of the disclosure. As illustrated in FIG. 8, a super pseudo-live service 708 may be communicatively coupled to a remote system(s) 702, a database 722, a manifest manipulation system(s) 802, and a manifest source 804.

As further illustrated in FIG. 8, the remote system(s) 702 may in turn be communicatively coupled to one or more user device(s) 126 according to one or more embodiments. As discussed previously herein, the remote system(s) 702 can receive manifest and fragment requests from the user device(s) 126, can forward these requests to the super pseudo-live service(s) 708, and in return, can receive one or more fragment redirects from the super pseudo-live service(s) 708.

In some embodiments, the manifest manipulation system(s) 802 may include an ad decision system(s) 806, an ad insertion system(s) 808, and/or an ad fragment source 810. In some embodiments, the ad decision system(s) 806 may be responsible for triggering a secondary content insertion into a live feed 812 according to one or more embodiments. In some embodiments, the ad insertion system(s) 808 may be responsible for the actual fragment insertion associated with a secondary content insertion, according to one or more embodiments. In some embodiments, the ad fragment source 810 may be a database or other storage having one or more ad fragments.

In some embodiments, the manifest source 804 may include a live encoder 814, a packager 816, and a main content fragment source 818. In some embodiments, the live encoder 814 may be responsible for encoding the live feed 812. In some embodiments, the packager 816 may be responsible for packaging the encoded data into an initial manifest. In some embodiments, the manifest source 804 provides this initial manifest to the manifest manipulation system(s) 802 so that the initial manifest can be edited for secondary content insertion according to one or more embodiments.

In some embodiments, the super pseudo-live service(s) 708 determines a fragment type associated with a requested fragment by matching fragment data in the fragment request (e.g., a fragment index, a customer ID, etc.) to fragment data stored in the database 722. Once the fragment type is known, the super pseudo-live service(s) 708 can provide a redirect(s) 820 to the remote system(s) 702. As discussed previously herein, the remote system(s) 702 can use the redirect(s) 820 to fetch and cache a requested fragment from the appropriate fragment source. For example, if the requested fragment is a main content fragment, the redirect 820 may include a pointer to the main content fragment source 818. In another example, if the requested fragment is a secondary content fragment, the redirect 820 may include a pointer to the ad fragment source 810.

Figure 9:
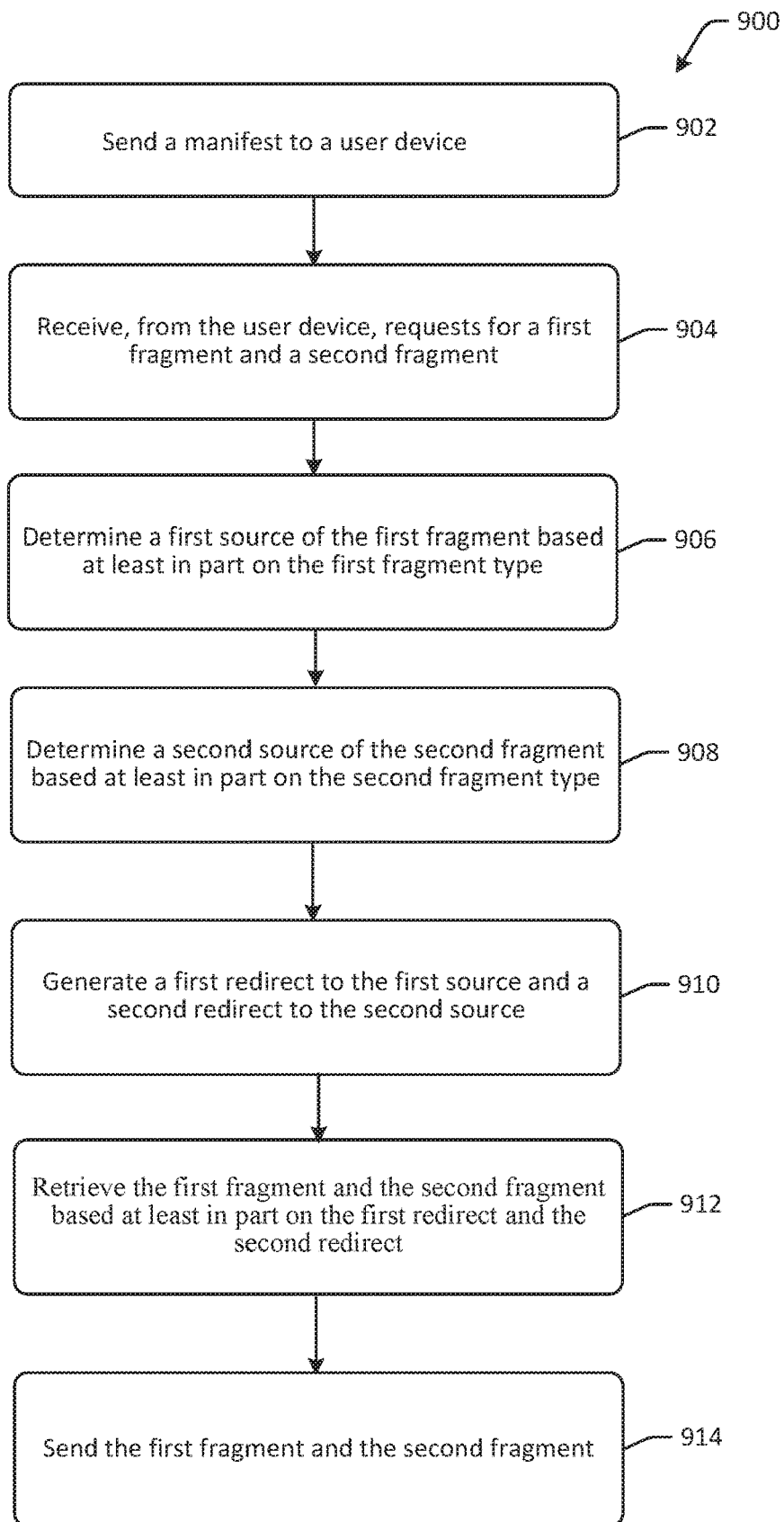
FIG. 9 is a schematic illustration of an example process flow in accordance with one or more example embodiments of the disclosure.

FIG. 9 schematically illustrates an example use case and an example process flow 900 in accordance with one or more example embodiments of the disclosure. Some or all of the blocks of the process flow 900 may be performed in a distributed manner across any number of devices. The operations of the process flow 900 may be optional and may be performed in a different order.

At block 902, a manifest may be sent to a user device according to one or more embodiments. In some embodiments, the manifest may be a smooth streaming VOD-style manifest prepared by a super pseudo-live service. In some embodiments, the manifest includes a first pointer to a first fragment and a second pointer to a second fragment. In some embodiments, the first fragment is of a first fragment type associated with a first content (e.g., a main content feed or stream). In some embodiments, the second fragment is of a second fragment type associated with a second content (e.g., a secondary content). At block 904, a combined request or separate requests for a first fragment and a second fragment may be received from the user device. In some embodiments, a first association of the first fragment with the first fragment type and a second association of the second fragment with the second fragment type may be determined. In some embodiments, fragment data associated with the first fragment and the second fragment may be stored on a database. The fragment data can include, for example, a fragment index and a fragment type of each fragment.

At block 906, a first source of the first fragment may be identified based at least in part on the first fragment type. Similarly, at block 908, a second source of the second fragment may be identified based at least in part on the second fragment type.

At block 910, a first redirect to the first source for retrieving the first fragment and a second redirect to the second source for retrieving the second fragment are generated. In some embodiments, the redirects are HTTP redirects.

At block 912, the first fragment and the second fragment are retrieved based at least in part on the first redirect and the second redirect. In some embodiments, the first fragment and the second fragment are retrieved sequentially. In some embodiments, the first fragment and the second fragment are retrieved substantially simultaneously.

At block 914, the first fragment and the second fragment are sent to the user device based at least in part on the first redirect and the second redirect. In some embodiments, a remote system or content delivery network retrieves the fragments using the redirects and supplies the fragments to the user device.

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art may recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 10:
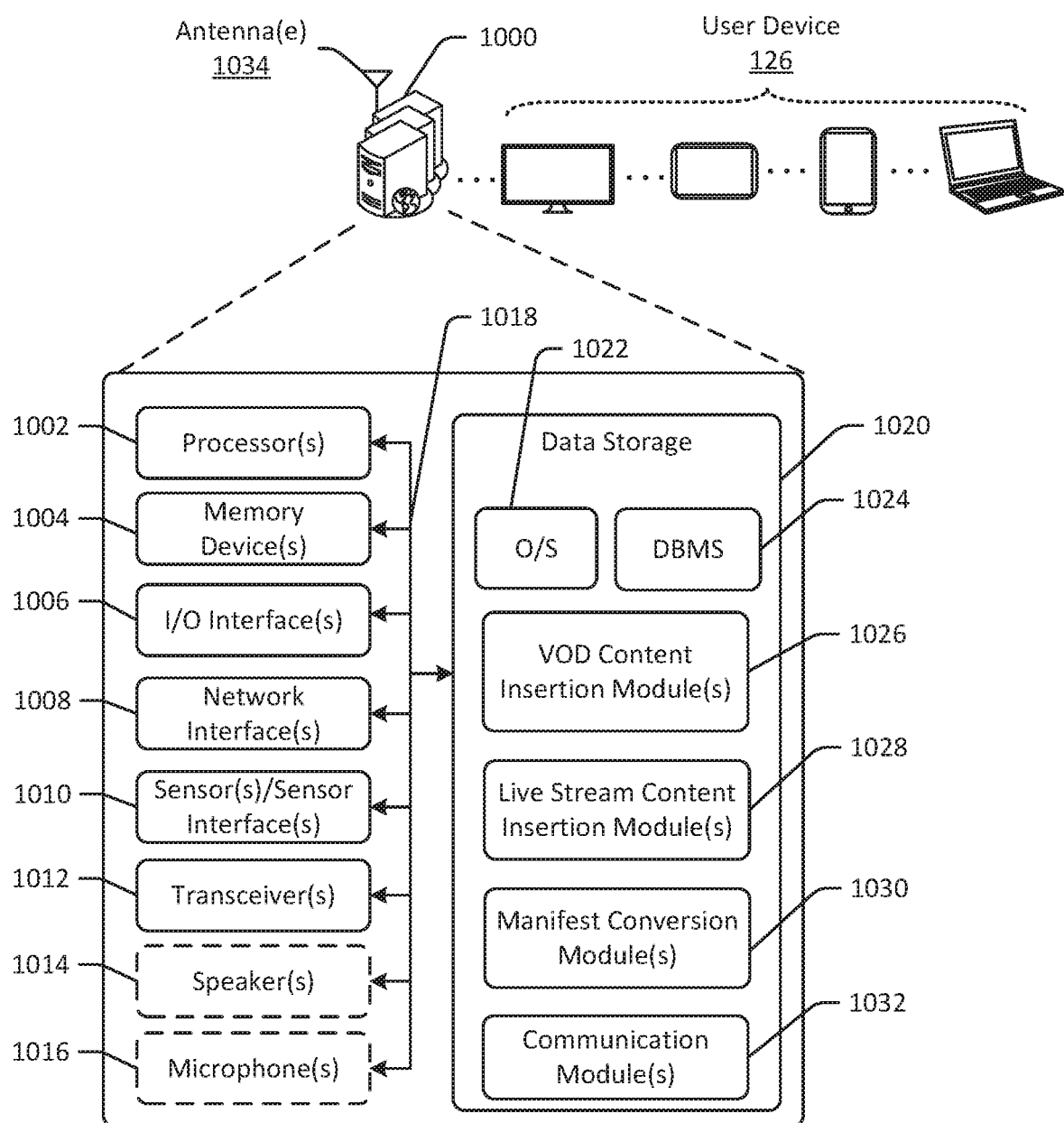
FIG. 10 is a schematic block diagram of an illustrative device in accordance with one or more example embodiments of the disclosure.

FIG. 10 is a schematic block diagram of an illustrative remote server 1000 in accordance with one or more example embodiments of the disclosure. The remote server 1000 may include any suitable computing device capable of receiving and/or generating data including, but not limited to, a remote system (e.g., the remote system 106 of FIG. 1), a super pseudo-live service (e.g., the super pseudo-live service 708 of FIG. 7) or the like. The remote server 1000 may correspond to an illustrative device configuration for the devices of FIGS. 1-9.

The remote server 1000 may be configured to communicate via one or more networks with one or more servers, search engines, user devices, or the like. In some embodiments, a single remote server or single group of remote servers may be configured to perform product collection generation, product collection surfacing, and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 1000 may include one or more processors (processor(s)) 1002, one or more memory devices 1004 (generically referred to herein as memory 1004), one or more input/output (I/O) interface(s) 1006, one or more network interface(s) 1008, one or more sensors or sensor interface(s) 1010, one or more transceivers 1012, one or more optional speakers 1014, one or more optional microphones 1016, and data storage 1020. The remote server 1000 may further include one or more buses 1018 that functionally couple various components of the remote server 1000. The remote server 1000 may further include one or more antenna(e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the remote server 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the remote server 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more database management systems (DBMS) 1024; and one or more program module(s), applications, engines, computer-executable code, scripts, or the like such as, for example, one or more VOD secondary content insertion module(s) 1026, one or more live stream secondary content insertion module(s) 1028, one or more manifest conversion module(s) 1030, and one or more communication module(s) 1032. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory device(s) 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the remote server 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, threat intelligence data, whitelisted entity data, user account information, user profile information, machine learning models, historical accuracy data, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the remote server 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the VOD secondary content insertion module(s) 1026 may include computer-executable instructions, code, or the like that responsive to execution by one or more of the processor(s) 1002 may perform functions including, but not limited to, a VOD-type manifest manipulation with a secondary content insertion according to one or more embodiments, one or more byte offset and/or byte length edits, and one or more fragment merges.

The live stream module(s) 1028 may include computer-executable instructions, code, or the like that responsive to execution by one or more of the processor(s) 1002 may perform functions including, but not limited to, the conversion of a live-style manifest to a VOD-style manifest, and the identification and providing of one or more fragment redirects.

The manifest conversion module(s) 1030 may include computer-executable instructions, code, or the like that responsive to execution by one or more of the processor(s) 1002 may perform functions including, but not limited to, receiving a life-style manifest, and converting the life-style manifest into a VOD-style manifest.

The communication module(s) 1032 may include computer-executable instructions, code, or the like that responsive to execution by one or more of the processor(s) 1002 may perform functions including, but not limited to, communicating with one or more devices, for example, via wired or wireless communication, communicating with remote servers, communicating with remote datastores, sending or receiving notifications or alerts, communicating with cache memory data, and the like.

Referring now to other illustrative components depicted as being stored in the data storage 1020, the O/S 1022 may be loaded from the data storage 1020 into the memory 1004 and may provide an interface between other application software executing on the remote server 1000 and hardware resources of the remote server 1000. More specifically, the O/S 1022 may include a set of computer-executable instructions for managing hardware resources of the remote server 1000 and for providing common services to other application programs (e.g., managing memory allocation among various application programs). In certain example embodiments, the O/S 1022 may control execution of the other program module(s) to dynamically enhance characters for content rendering. The O/S 1022 may include any operating system now known or which may be developed in the future including, but not limited to, any server operating system, any mainframe operating system, or any other proprietary or non-proprietary operating system.

The DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 1000 is a mobile device, the DBMS 1024 may be any suitable light-weight DBMS optimized for performance on a mobile device.

Referring now to other illustrative components of the remote server 1000, the input/output (I/O) interface(s) 1006 may facilitate the receipt of input information by the remote server 1000 from one or more I/O devices as well as the output of information from the remote server 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(e) 1034 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 1000 may further include one or more network interface(s) 1008 via which the remote server 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna(e) 1034 may include any suitable type of antenna depending, for example, on the communications protocols used to transmit or receive signals via the antenna (e) 1034. Non-limiting examples of suitable antennas may include directional antennas, non-directional antennas, dipole antennas, folded dipole antennas, patch antennas, multiple-input multiple-output (MIMO) antennas, or the like. The antenna(e) 1034 may be communicatively coupled to one or more transceivers 1012 or radio components to which or from which signals may be transmitted or received.

As previously described, the antenna(e) 1034 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1034 may additionally, or alternatively, include a Wi-Fi antenna configured to transmit or receive signals in accordance with established standards and protocols, such as the IEEE 752.11 family of standards, including via 2.4 GHz channels (e.g., 752.11b, 752.11g, 752.11n), 5 GHz channels (e.g., 752.11n, 752.11ac), or 60 GHz channels (e.g., 752.11ad). In alternative example embodiments, the antenna(e) 1034 may be configured to transmit or receive radio frequency signals within any suitable frequency range forming part of the unlicensed portion of the radio spectrum.

The antenna(e) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(e) 1034—transmitting or receiving radio frequency (RF) signals in the bandwidth and/or channels corresponding to the communications protocols utilized by the remote server 1000 to communicate with other devices. The transceiver(s) 1012 may include hardware, software, and/or firmware for modulating, transmitting, or receiving—potentially in cooperation with any of antenna(e) 1034—communications signals according to any of the communications protocols discussed above including, but not limited to, one or more Wi-Fi and/or Wi-Fi direct protocols, as standardized by the IEEE 752.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the remote server 1000. The transceiver(s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 1014 may be any device configured to generate audible sound. The optional microphone(s) 1016 may be any device configured to receive analog sound input or voice data.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 1000, and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the remote server 1000 may include alternate and/or additional hardware, software, or firmware components beyond those described or depicted without departing from the scope of the disclosure. More particularly, it should be appreciated that software, firmware, or hardware components depicted as forming part of the remote server 1000 are merely illustrative and that some components may not be present or additional components may be provided in various embodiments. While various illustrative program module(s) have been depicted and described as software module(s) stored in data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s)

of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   sending, by one or more computer processors coupled to memory, a first manifest to a user device, the first manifest comprising a first pointer to a first fragment and a second pointer to a second fragment, wherein the first fragment is of a first fragment type associated with a first content, and the second fragment is of a second fragment type associated with a second content;
   receiving, by the one or more computer processors coupled to memory, from the user device, a request for the first fragment;
   receiving, by the one or more computer processors coupled to memory, from the user device, a request for the second fragment;

receiving, by the one or more computer processors, a second manifest having a third fragment associated with the first fragment, the third fragment including header data;
removing portions of the header data from the third fragment to generate the first fragment;
determining, by the one or more computer processors coupled to memory, a source for the second fragment based at least in part on the second fragment type;
generating, by the one or more computer processors coupled to memory, a first redirect to the source;
retrieving, by the one or more computer processors coupled to memory, the second fragment based at least in part on the first redirect; and
sending, by the one or more computer processors coupled to memory, the first fragment and the second fragment.

2. The method of claim 1, further comprising:
determining a fragment index received from the user device; and
determining, by the one or more computer processors coupled to memory, a first association of the first fragment with the first fragment type and a second association of the second fragment with the second fragment type;
wherein determining the first association of the first fragment with the first fragment type is based at least in part on the fragment index.

3. The method of claim 1, further comprising:
receiving, by the one or more computer processors, an insertion point associated with the first content; and
generating the first manifest based at least in part on inserting the second pointer to the second fragment into the first manifest at the insertion point.

4. The method of claim 3, wherein generating the first manifest further comprises replacing, by the one or more computer processors, a third fragment of the first manifest with the second fragment.

5. The method of claim 1, further comprising:
providing, by the one or more computer processors, the first redirect.

6. The method of claim 5, further comprising:
causing to send, to the network device, the second fragment based at least in part on the first redirect.

7. The method of claim 1, wherein the second manifest comprises the first content, the method further comprising:
generating, by the one or more computer processors, the first manifest;
wherein generating the first manifest includes inserting a pointer to the second content into the second manifest.

8. A device comprising:
at least one memory that stores computer-executable instructions; and
at least one processor configured to access the memory and execute the computer-executable instructions to:
send a first manifest to a user device, the first manifest comprising a first pointer to a first fragment and a second pointer to a second fragment, wherein the first fragment is of a first fragment type associated with a first content, and the second fragment is of a second fragment type associated with a second content;
receive, from the user device, a request for the first fragment;
receive, from the user device, a request for the second fragment;
receive a second manifest having a third fragment associated with the first fragment, the third fragment including header data;
remove portions of the header data from the third fragment to generate the first fragment;
determine a source for the second fragment based at least in part on the second fragment type;
generate a first redirect to the source;
retrieve the second fragment based at least in part on the first redirect; and
send the first fragment and the second fragment.

9. The device of claim 8, wherein the at least one processor is further configured to:
determine a fragment index received from the user device;
determine a first association of the first fragment with the first fragment type and a second association of the second fragment with the second fragment type;
wherein determining the first association of the first fragment with the first fragment type is based at least in part on the fragment index.

10. The device of claim 8, wherein the at least one processor is further configured to:
receive an insertion point associated with the first content; and
generate the first manifest based at least in part on inserting the second pointer to the second fragment into the first manifest at the insertion point.

11. The device of claim 10, wherein generating the first manifest further comprises replacing, by the one or more computer processors, a third fragment of the first manifest with the second fragment.

12. The device of claim 8, wherein the at least one processor is further configured to:
provide the first redirect.

13. The device of claim 12, wherein the at least one processor is further configured to:
cause to send, to the network device, the second fragment based at least in part on the first redirect.

14. The device of claim 8, wherein the second manifest comprises the first content, and wherein the at least one processor is further configured to:
generate the first manifest;
wherein generating the first manifest includes inserting a pointer to the second content into the second manifest.

15. At least one non-transitory computer-readable medium comprising computer-executable instructions that, when executed by one or more processors, executes operations comprising:
sending a first manifest to a user device, the first manifest comprising a first pointer to a first fragment and a second pointer to a second fragment, wherein the first fragment is of a first fragment type associated with a first content, and the second fragment is of a second fragment type associated with a second content;
receiving, from the user device, a request for the first fragment;
receiving, from the user device, a request for the second fragment;
receiving a second manifest having a third fragment associated with the first fragment, the third fragment including header data;
removing portions of the header data from the third fragment to generate the first fragment;
determining a source for the second fragment based at least in part on the second fragment type;

generating a first redirect to the source;
retrieving the second fragment based at least in part on the first redirect; and
sending the first fragment and the second fragment.

16. The at least one non-transitory computer-readable medium of claim 15, wherein the operations further comprise:
   determining a fragment index received from the user device; and
   determining a first association of the first fragment with the first fragment type and a second association of the second fragment with the second fragment type;
   wherein determining the first association of the first fragment with the first fragment type is based at least in part on the fragment index.

17. The at least one non-transitory computer-readable medium of claim 15, wherein the operations further comprise:
   receiving an insertion point associated with the first content; and
   generating the first manifest based at least in part on inserting the second pointer to the second fragment into the first manifest at the insertion point.

18. The at least one non-transitory computer-readable medium of claim 17, wherein generating the first manifest further comprises replacing, by the one or more computer processors, a third fragment of the first manifest with the second fragment.

19. The at least one non-transitory computer-readable medium of claim 15, wherein the operations further comprise:
   providing the first redirect.

20. The at least one non-transitory computer-readable medium of claim 19, wherein the operations further comprise:
   causing to send, to the network device, the second fragment based at least in part on the first redirect.

* * * * *